US009089902B2

(12) United States Patent
Binmore

(10) Patent No.: US 9,089,902 B2
(45) Date of Patent: Jul. 28, 2015

(54) HOLE DRILLING APPARATUS AND PROCESS FOR EDGE MOUNTED RFID TAG

(75) Inventor: Ian Rex Binmore, Houston, TX (US)

(73) Assignee: Vallourec Oil and Gas France, S.A.S., Aulnoye-Aymeries (FR)

( * ) Notice: Subject to any disclaimer, the term of this patent is extended or adjusted under 35 U.S.C. 154(b) by 1356 days.

(21) Appl. No.: 12/580,151

(22) Filed: Oct. 15, 2009

(65) Prior Publication Data

US 2010/0098507 A1 Apr. 22, 2010

Related U.S. Application Data

(60) Provisional application No. 61/106,085, filed on Oct. 16, 2008.

(51) Int. Cl.
  B23B 45/14 (2006.01)
  B23B 47/28 (2006.01)
  B23B 49/02 (2006.01)

(52) U.S. Cl.
  CPC ............ B23B 47/28 (2013.01); B23B 49/02 (2013.01); B23B 2247/12 (2013.01); B23B 2260/004 (2013.01); B23B 2265/12 (2013.01)

(58) Field of Classification Search
  USPC .......... 408/1 R, 115, 241, 76, 79, 87, 88, 95, 408/97, 98, 110, 712
  IPC ...................................................... B23B 45/14
  See application file for complete search history.

(56) References Cited

U.S. PATENT DOCUMENTS

| 1,923,847 | A | * | 8/1933 | Seelert | 408/83.5 |
| 1,954,241 | A | * | 4/1934 | Hellyer | 408/83.5 |
| 2,693,134 | A | * | 11/1954 | Mole | 409/179 |
| 2,963,927 | A | * | 12/1960 | Hanger | 408/79 |
| 3,007,686 | A | * | 11/1961 | Pearson | 173/33 |
| 3,065,654 | A | * | 11/1962 | Critelli et al. | 408/112 |
| 3,230,834 | A | * | 1/1966 | Bohannon | 408/83.5 |
| 3,436,155 | A | * | 4/1969 | Perin, Jr. | 356/138 |
| 3,838,935 | A | * | 10/1974 | Boyajian | 408/75 |
| 3,969,036 | A | * | 7/1976 | Hougen | 408/76 |
| 4,011,024 | A | * | 3/1977 | Nakano et al. | 408/79 |
| 4,836,720 | A | * | 6/1989 | Hadden | 408/112 |
| 5,062,746 | A | * | 11/1991 | Deremo | 408/79 |
| 5,217,331 | A | * | 6/1993 | Ericksen | 408/42 |
| 6,077,001 | A | * | 6/2000 | Fetzer | 408/115 R |

FOREIGN PATENT DOCUMENTS

WO  WO 2009050337 A1 * 4/2009

* cited by examiner

Primary Examiner — Andrea Wellington
Assistant Examiner — Alan Snyder
(74) Attorney, Agent, or Firm — Oblon, Spivak, McClelland, Maier & Neustadt, L.L.P.

(57) ABSTRACT

A drilling template and a method for utilizing the drilling template to drill a hole in an object. The drilling template may include a through-bolt assembly to pivotally couple the drilling template to the object. The drilling template may further include a cam assembly configured to rotate the drilling template about the through-bolt assembly until it is locked into a fixed position using a guide pin coupled to the drilling template. The drilling template may be particularly useful in retrofitting heavy equipment in field use with RFID tags, and more specifically, with edge-mounted RFID tags.

25 Claims, 8 Drawing Sheets

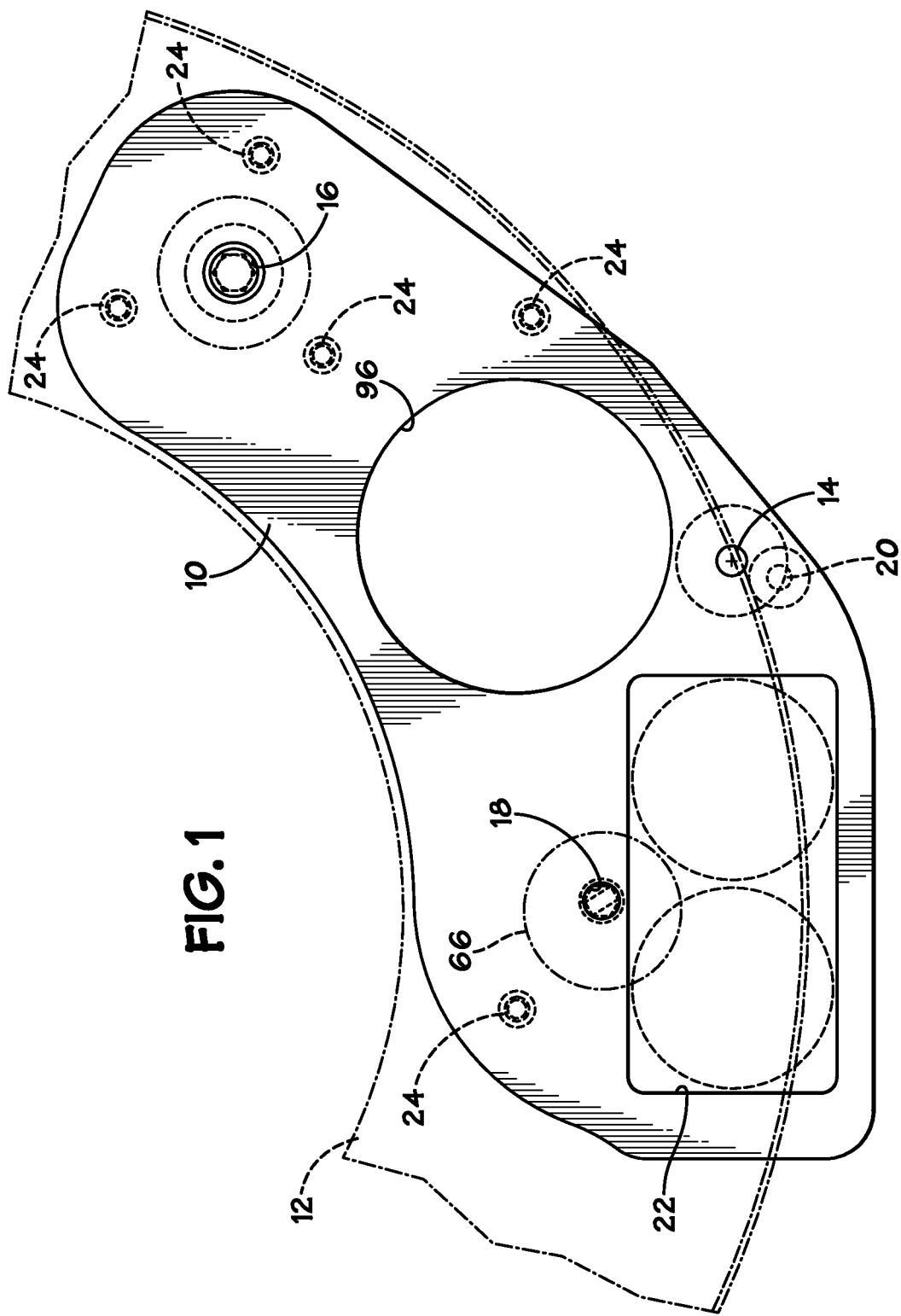

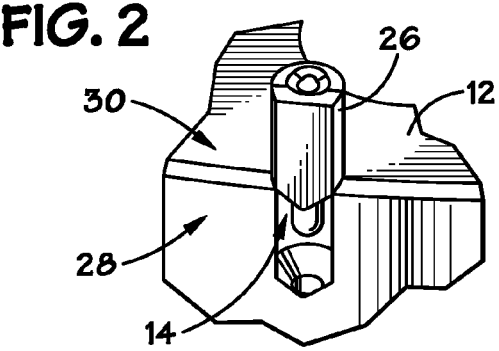
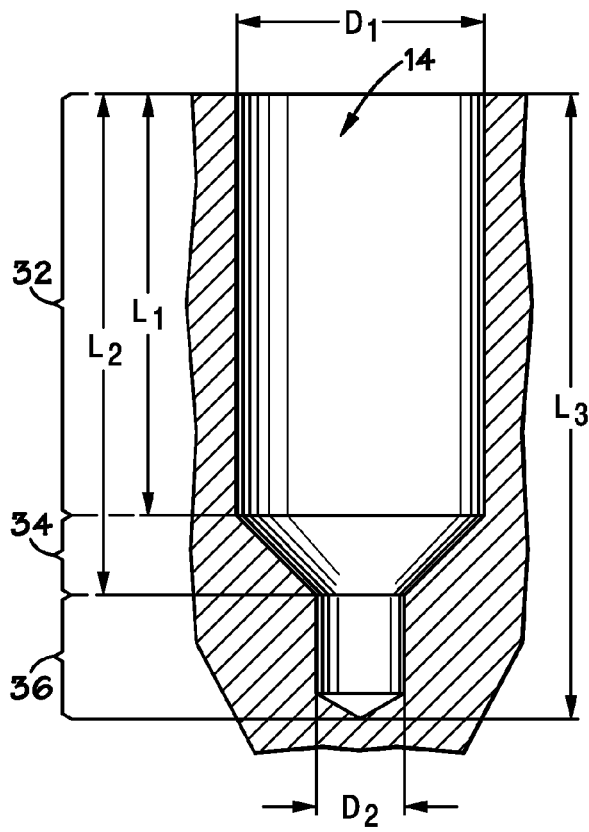
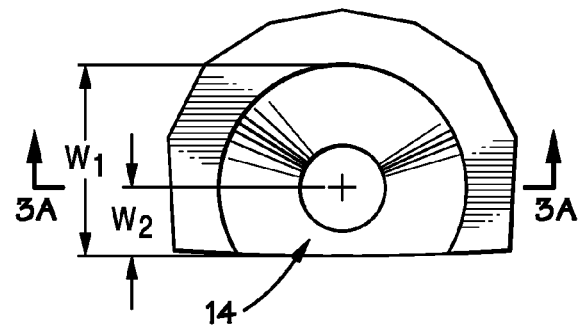

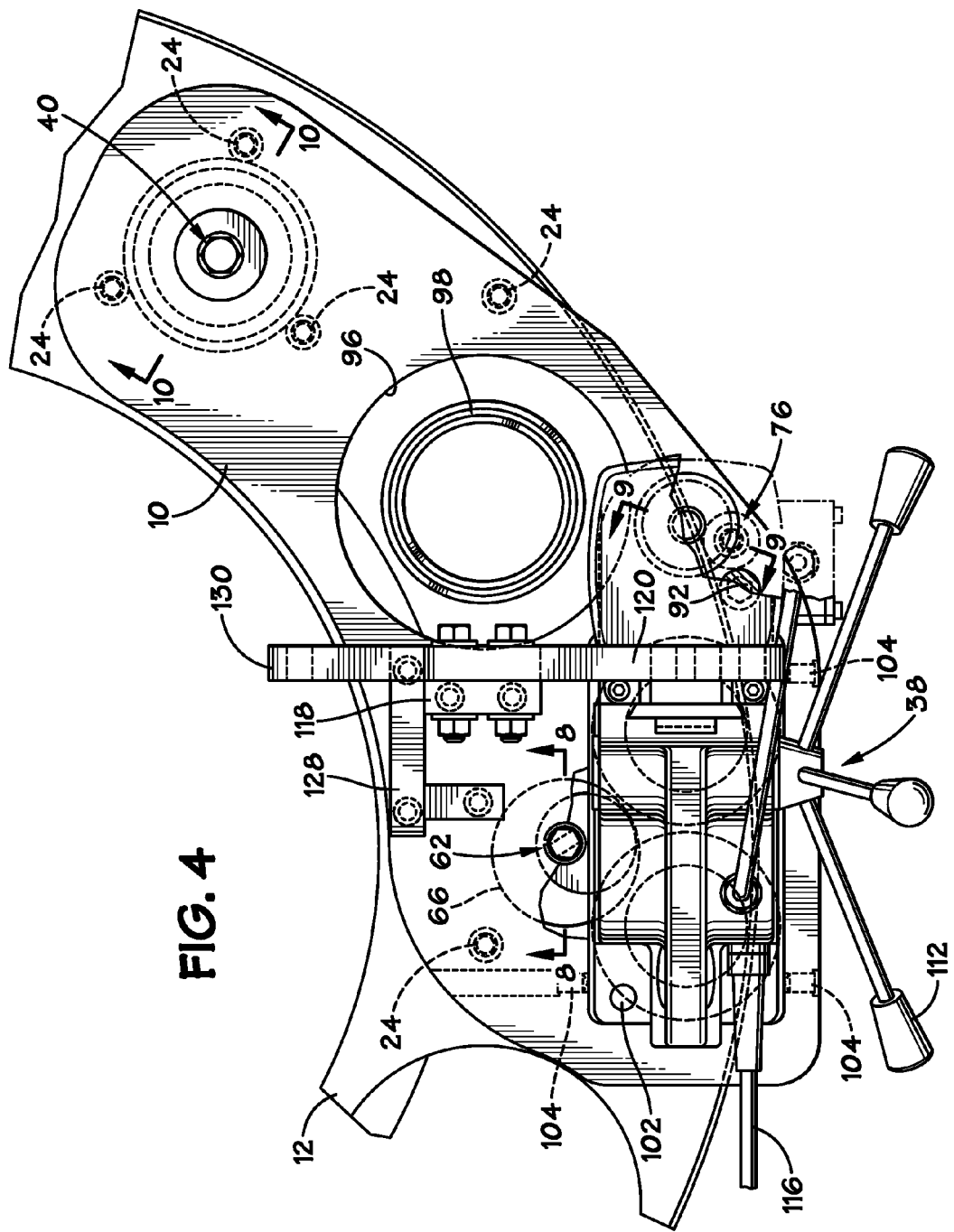

FIG. 6

HOLE DRILLING APPARATUS AND PROCESS FOR EDGE MOUNTED RFID TAG

RELATED APPLICATIONS

This application claims priority to U.S. Provisional Application No. 61/106,085, filed, Oct. 16, 2008, and is herein incorporated by reference.

BACKGROUND

1. Field of Invention

Embodiments of the invention relate generally to an apparatus to aid in drilling holes in a material, and more specifically, to an apparatus and process to aid in drilling holes configured to receive RFID tags. The apparatus and process provide an accurate and efficient manner of drilling a hole in an edge of a material.

2. Description of Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light and not as admissions of prior art.

RFID tags are often used to manage and track objects, such as system components, tools, machinery, equipment, etc., through production, inventory, storage, deployment and/or product use. In general, RFID tags include a microchip or integrated circuit used to transmit and/or store identification information. An external transceiver/interrogator/reader located remotely with respect to the RFID tag is used to receive information from and/or transmit information to the RFID tag. The RFID tag typically includes an antenna that transmits RF signals relating to the identification of the RFID tag to the RFID transceiver/reader/interrogator.

For certain applications, such as surface and downhole oil and gas applications, RFID tags may be utilized to track equipment and inventory. However, to be particularly useful, the RFID tags should be designed such that equipment can be tracked while in storage, transit, and field use, (i.e., surface, downhole and underwater), depending on the type of equipment and the utilization thereof. RFID tags placed into the edge of some types of equipment, such as pipe flanges for example, will provide exposure of the RFID tag to a reader/interrogator no matter how the pipe flange is oriented and whether or not the flange is bolted or fastened to a mating surface. In this example, there is a distinct usability advantage over placing a tag in just the face of the flange or the side of the flange or using multiple tags. Retrofitting equipment, such as heavy steel-based equipment, with RFID tags, especially when the equipment is already in field use, offers a number of challenges. For applications, wherein the placement of the RFID tag requires a great deal of accuracy and placement into the material in a manner which will protect the RFID tag from physical harm, the challenges become even greater.

To retrofit a heavy metal component with an RFID tag, a tag pocket may be drilled into the component. The typical field tool used to drill a hole in the heavy metal (e.g., steel) component is a magnetic drill. Positioning the relatively heavy magnetic tool accurately is often difficult, yet hole accuracy may be important to the successful placement of the RFID tag. Further, if a magnetic drill is used on a horizontal position, and there is any sort of power interruption or surge that causes the magnetic holding force to surge or be reduced, the tool may immediately shift, fall, spin or the like, if unrestrained. Furthermore, in such a power loss, the drill bit might break off in the hole, or it may be difficult to reposition the tool accurately enough to continue drilling the same tag pocket accurately. These events can also create a danger to personnel using the tool, increase the risk of damage to expensive equipment, increase the time it takes to install tags and increase the risk of loss of working tools.

It may be desirable to provide an apparatus and process for drilling holes in heavy equipment that greatly reduces or eliminates the possibilities of some or all of the problems mentioned above. Specifically, it may be desirable to provide an apparatus and process for drilling a tag pocket safely, accurately, quickly and reliably.

BRIEF DESCRIPTION OF DRAWINGS

Certain embodiments are described in the following detailed description and in reference to the drawings in which:

FIG. 1 illustrates a schematic view of a drilling template, in accordance with embodiments of the invention;

FIG. 2 illustrates a schematic view of an edge mounted RFID tag being inserted into a tag pocket formed at the edge of an object using the drilling template, in accordance with embodiments of the invention;

FIGS. 3A and 3B illustrate side and top views, respectively, of the drilling detail of a tag pocket configured to receive the edge mounted RFID tag, in accordance with embodiments of the invention;

FIGS. 4-7 illustrates various schematic views of the template being used to drill a tag pocket, in accordance with an embodiment of the invention.

DETAILED DESCRIPTION

Figure 5:
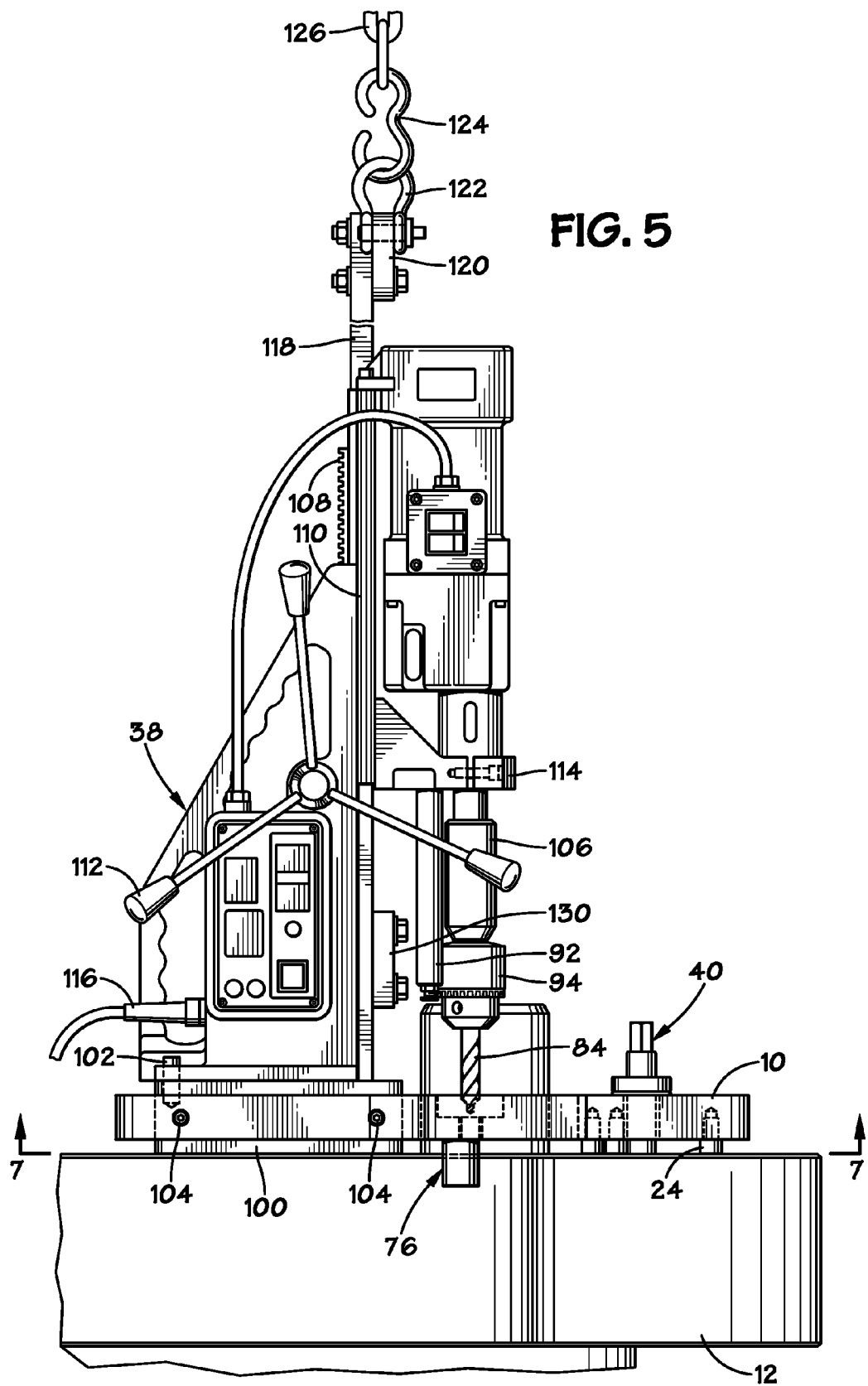

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, embodiments of the invention are directed to an apparatus to aid in drilling a hole into a tool or piece of equipment. In one embodiment, the hole may be configured to receive an RFID tag for tracking the tool or piece of equipment. Further, when an edge-mounted RFID tag is desired, the present embodiments allow for an accurate, reliable and safe way to drill the tag pocket on the edge of the tool or equipment. In accordance with the present embodiments, a drilling template is provided for drilling a tag pocket at the edge of a flange that may be part of a riser, configured for downhole or subsea use. The drilling template is pre-fabricated and configured such that it will mate to a flange having a known configuration of through holes. The template is designed to make use of the arrangement of holes and features on the flange, such that the drilling template may be mounted on the flange quickly and accurately. The drilling template also provides for an easy way to mount a magnetic drill, such that the drill is secured in position while the tag pocket is being drilled, regardless of whether power is lost or reduced. Features of the drilling template provide for accurate alignment and stability of the drill such that a precise hole can be drilled at the edge of the flange, such that an edge-mounted RFID tag can be deposited therein.

As will be described further below, the template includes a number of features that are designed to work in conjunction with known and pre-existing features on the flange. By designing the template to work in conjunction with known flange designs, the template can be used in the field or in a warehouse to drill tag pockets such that the equipment can be retrofitted with RFID tags. The template is designed to work in conjunction with a standard magnetic drill. A base of the magnetic drill is held in place by the template, which is also secured to the flange when the tag pocket is drilled. Thus, a template may be customized for usage with a particular drill and a particular flange.

Among the features of the template further described below are a through-bolt assembly, a cam assembly and a guide pin. The through-bolt assembly is positioned through the template such that it engages an existing nut on the flange. Alternatively, if desired, a special nut may be drilled into the flange to receive the through-bolt assembly. The through-bolt assembly provides a mechanism for accurately positioning the template at a known point on the flange. The through-bolt assembly anchors the template and allows the template to be angularly positioned on the flange about the through-bolt assembly. The cam assembly includes a cam shaft that is coupled to the template and an eccentric disc that is configured to be positioned within any existing hole in the flange, including the center hole of the flange, or to any roughly opposing surface from the guide pin of the flange. If desired, an additional hole may be drilled. The cam assembly is configured such that when the cam assembly is rotated, the cam will pivot the template assembly about the through bolt and pull the guide pin against the edge of the material to be drilled. The guide pin is coupled to the backside of the template and configured such that it provides a stop to lock the template, and thus the drill, which is coupled to the template, into position for drilling the tag pocket. The guide pin is configured to provide a fixed position of the drill center at a desired distance from the edge of the flange. In this way, the tag pocket may be accurately drilled into the edge of the flange. As will be described in detail below, other features of the template may also be included.

Figure 8:
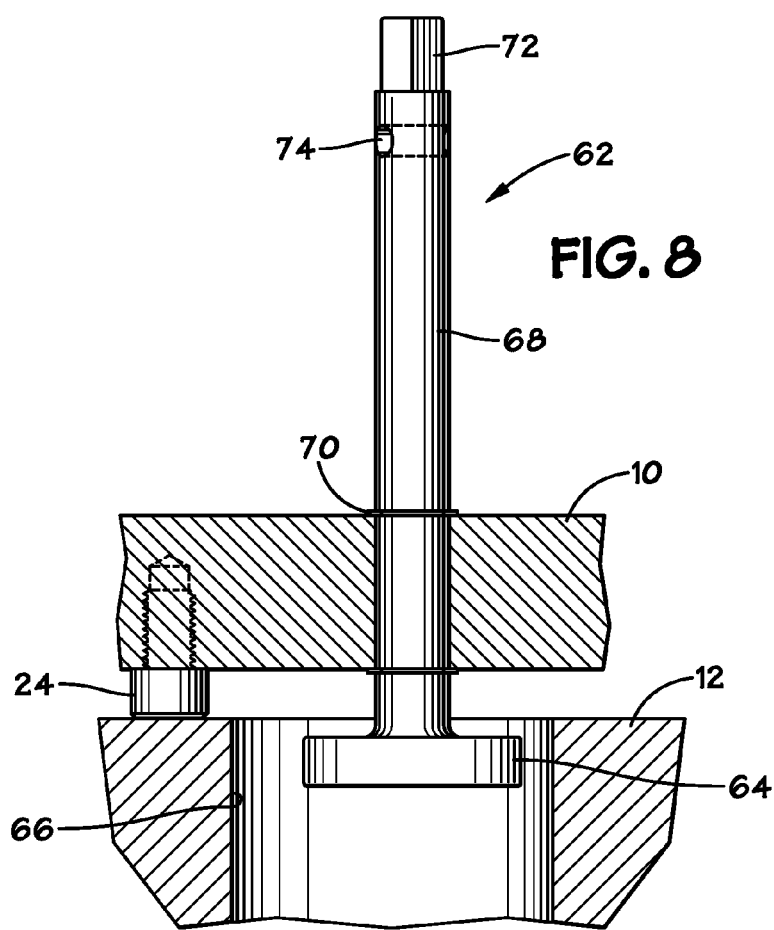
FIGS. 8-10B illustrate components of the template, in accordance with embodiments of the invention.
Figure 9:
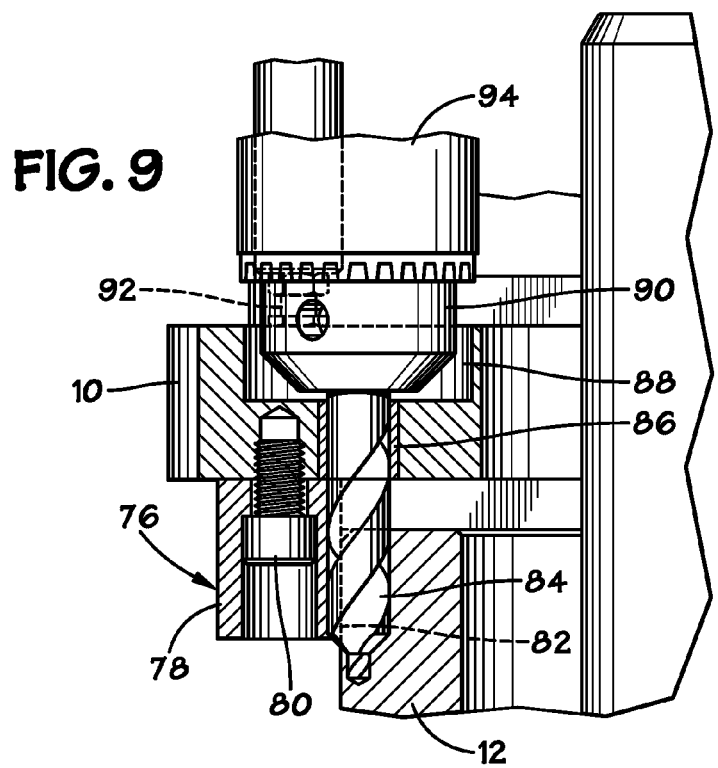
Figure 10A:
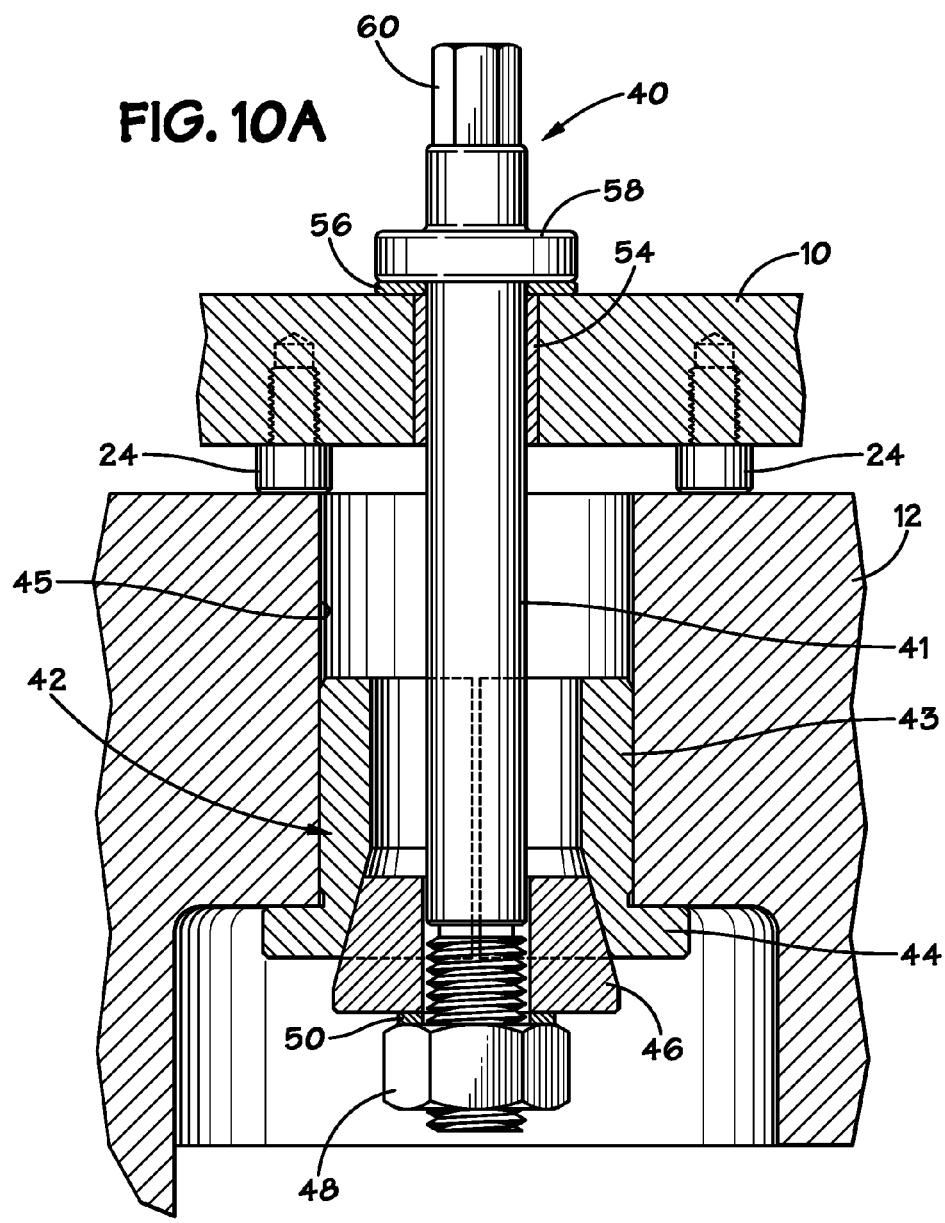
Figure 10B:
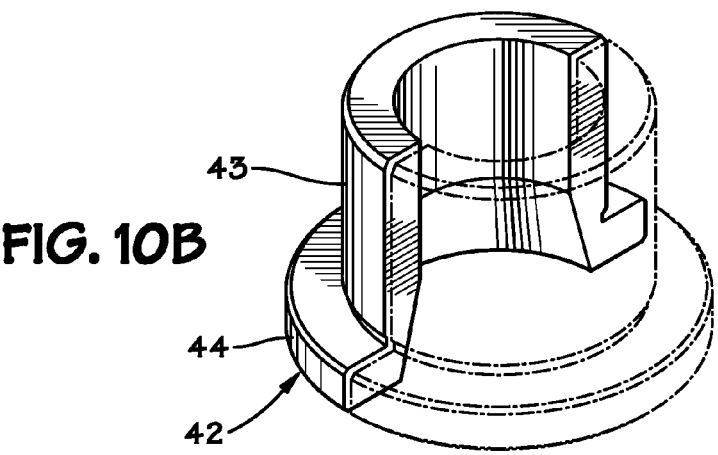

Turning to the drawings, embodiments of the present invention are described in greater detail below. Specifically, FIG. 1 illustrates the drilling template and certain features thereof as it would be positioned on a flange to drill a tag pocket for an edge mounted RFID tag. FIG. 2 illustrates an RFID tag being installed into a tag pocket, drilled in accordance with embodiments of the present invention. FIGS. 3A and 3B illustrate cross-sectional and top views, respectively, of the tag pocket. FIGS. 4-7 illustrate various views of the drilling template as it would be employed to drill a tag pocket. FIG. 8 illustrates a more detailed view of the cam assembly. FIG. 9 illustrates a more detailed view of the guide-pin, and FIGS. 10A and 10B illustrates a more detailed view of the through-bolt assembly.

Referring initially to FIG. 1, a schematic top view of the drilling template 10 positioned in a drilling position over a flange 12 is illustrated. As can be seen and as will be described below, the drilling template 10 is sized and shaped such that it may be employed to drill a tag pocket 14 at the edge of the flange 12. As will be appreciated, the drilling template 10 is preconfigured such that certain features of the drilling template 10 align with known features on the flange 12. By designing the drilling template 10 to mate with known features of the flange 12, the template 10 may be mechanically coupled to the flange 12 using the known features of the flange 12 and in such a way that a magnetic drill can also be mechanically coupled to the template 10 to insure reliable, safe and accurate drilling of the tag pocket 14 in the flange 12. Accordingly, it should be understood that the placement and proximity of the features of the template 10 will vary depending on the tool or equipment (here, flange 12) into which a tag pocket 14 is to be drilled, as well as the type of drill used to drill the tag pocket 14.

As will be evident through further detailed description below, the template 10 is configured to receive a number of elements. The placement of those elements will be dependant on the design of the underlying flange 12 and such that the geometry of the template and its relationship to a pivot point (e.g., the through bolt assembly) and the cam assembly will position the hole accurately in all dimensions. Specifically, the template 10 includes a through-bolt hole 16 which is configured to receive a through-bolt assembly to engage both the template 10 and the underlying flange 12 in such a way so as to allow the template 10 to pivot about the through-bolt. The template 10 also includes a cam hole 18 through which the cam shaft of the cam assembly protrudes. The cam hole 18 in the template 10 is configured to align with a known hole in the underlying flange 12 and the eccentric disk coupled to the cam shaft is configured to engage the underlying hole in the flange 12 such that when rotated, the template 10 may pivot around the through-bolt and be secured in position above the flange 12 by a guide-pin. The guide-pin hole 20 on the underside of the template 10 is configured to receive a guide-pin such that it provides a stop a set distance from where the tag hole 14 should be drilled when the cam assembly is rotated such that the guide-pin engages the edge of the flange 12.

The template 10 also includes a drill base hole 22 which is sized and shaped to receive the base of a magnetic drill. Thus, the base of the magnetic drill will be positioned through the template 10 and against the underlying flange 12 during drilling. Also illustrated in FIG. 1 is a plurality of standoff allen head cap screws or feet 24 which are coupled to the underside of the template 10. The feet 24 are screwed into the underside of the template 10 and are configured to be the same height as the portion of the magnetic drill that will protrude through the bottom of the template 10. Accordingly, when the magnetic drill base is inserted into the drill base hole 22 and secured against the underlying flange 12, the feet 24 will provide planar stability for the template 10 such that the template 10 remains planar during the drilling process.

Referring now to FIGS. 2, 3A and 3B, details of the tag pocket 14 are illustrated. As will be appreciated, the template 10 can be designed and configured to drill a hole or tag pocket 14 in any desired location on the flange 12 or any other type of tool or equipment. While each of the illustrated embodiments is directed to formation of a tag pocket 14 at the edge of the flange 12, other tag pocket locations (e.g., non-edge) may also be employed in certain applications. The illustrated embodiments describe the drilling of an edge tag pocket 14, as greater accuracy may be required and the drilling process may be more difficult for an edge mounted RFID tag. As illustrated in FIG. 2, once the tag pocket 14 is drilled, the tag pocket 14 is configured to receive an RFID tag 26 such that the flange 12 can be tracked. As will be appreciated, the RFID tag 26 may include an antenna and an integrated circuit chip configured to transmit identification information to a reader which may be located remotely with respect to the RFID tag 26.

The tag pocket 14 is sized to receive the RFID tag 26. In certain embodiments, the tag pocket 14 may be sized such that the RFID tag 26 fits securely into the tag pocket 14 where the RFID tag 26 is secured merely by mechanical, frictional forces. Alternatively, or in addition, the RFID tag 26 may be secured in the tag pocket 14 with an adhesive or epoxy (not shown), or the hole may be internally threaded and the mating tag externally threaded about its mating surface, for instance. Once installed into the flange 12, the RFID tag 26 is configured such that it is exposed within the tag pocket 14 on two surfaces of the flange 12 (i.e., the edge surface 28 and the top surface 30). Advantageously the edge mounted RFID tag 26 is exposed on two surfaces, and thus can be read by a reader from a wide range of angles and regardless of whether the flange 12 is mated to another flange or tightly stacked into inventory either horizontally or vertically, because the RFID tag 26 will remain accessible to the reader in any of these configurations. Thus, in accordance with the presently illustrated embodiment, the tag pocket 14 into which the RFID tag 26 is installed is drilled such that it will have openings which will allow for propagation of radio signals, even if the tag pocket 14 is formed in steel or other radio opaque materials.

The presently illustrated RFID tag 26, and thus the tag pocket 14 provide physical advantages, as well. For instance, because the RFID tag 26 is entirely recessed into the surface of the flange 12, the flange 12 provides protection of the RFID tag 26 from impacts, abrasion, and other deleterious effects or events which could destroy a surface mounted tag. Thus, the tag pocket 14 is drilled such that it provides surrounding protection of the RFID tag 26, since the geometry of the RFID tag 26 is contained within the geometry of the flange 12, and specifically within the tag pocket 14.

Referring now to FIGS. 3A and 3B, aspects of the tag pocket 14 are described. Specifically, FIG. 3A illustrates a cross-sectional view of the tag pocket 14 taken through the cut lines 3A-3A of FIG. 3B and FIG. 3B illustrates a top view of the tag pocket 14. In the presently described embodiment, the tag pocket 14 is drilled into the edge of the flange 12 with a rounded hole that breaks out of the face normal to the long axis of the drill. The tag pocket 14 may be formed in the flange 12 using a step drill. As with the RFID tag 26, in the illustrated embodiment, the tag pocket 14 is drilled to include a body portion 32, a tapered portion 34, and a pilot portion 36. The body portion 32 has a diameter D1, at its widest point, and a length L1. The pilot portion 36 has a diameter D2 that is smaller than the diameter D1 of the body portion 32. The tapered portion 34 is formed between the body portion 32 and the pilot portion 36. The tag pocket 14 has a total length L3.

As best illustrated in FIG. 3B, in accordance with one embodiment, the tag pocket 14 has a cross-section that is hypersemicircular. That is, the shape of the cross-section is circular, and extends beyond a semicircle. Thus, the hypersemicircular circumference extends beyond 180°. The width W1 of the hypersemicircular tag pocket 14 is greater than the radius of the tag pocket 14. The hypersemicircular shape allows the RFID tag 26 to be installed into the flange 12 and secured therein by the walls of the flange 12 such that the RFID tag 26 will not slip out of the edge surface 28 of the flange 12, once installed. The opening in the edge surface 28 is narrower than the widest diameter D1 of the tag pocket 14. The width W2 which extends from the center of the tag pocket 14 to the edge surface 28 of the flange 12 is less then a radius of the semicircular side of the tag pocket 14. As will be appreciated, the shape, size and dimensions of the tag pocket 14 will depend on the particular shape, size and dimensions of the RFID tag 26. Drill bits may be designed and selected such that an appropriately sized and shaped tag pocket 14 may be achieved such that it is configured to securely receive the RFID tag 26.

Referring now to FIGS. 4 and 5 in conjunction, various features of the template 10 are illustrated. Specifically, FIG. 4 illustrates a top view of the template 10 positioned above the flange 12 and having a drill 38 positioned to drill the tag pocket 14. For clarity and simplicity, certain features have been eliminated or shown in shadowed or dashed lines. FIG. 5, shows a side view of the assembly wherein the template 10 is coupled to the flange 12 and the drill 38 is positioned to drill the tag pocket 14.

As previously described, the template 10 includes a through-bolt assembly 40 which extends through the through-bolt hole 16 (FIG. 1) of the template 10, and engages the underlying flange 12. In accordance with one embodiment, the through-bolt assembly 40 is configured to mate with a threaded nut that is configured to fit within an already existing hole in the flange 12. Thus, the shaft of the through-bolt assembly 40 is sized such that it extends through the template 10 and into an existing hole of the underlying flange 12, such that a lock nut can be used to engage the shaft of the through-bolt assembly 40 into a locked position within the flange 12.

Referring briefly to FIG. 10A, a more detailed view of the through-bolt assembly 40, taken along the cut lines 10-10 of FIG. 4, is illustrated. As previously described, and illustrated in greater detail with regard to FIG. 10A, the shaft 41 of the through-bolt assembly 40 extends through the template 10 and into an existing hole in the flange 12. The shaft 41 is secured within the flange 12 via a split sleeve 42. In the illustrated embodiment, the split sleeve 42 includes a barrel portion 43 and a lip portion 44, as illustrated in FIG. 10B. The barrel portion 43 is configured to fit within the pre-existing hole 45 within the flange 12. Referring again to FIG. 10A, the through-bolt assembly 40 may further include a tapered bushing 46 as well as a nut 48 and thrust washer 50. The tapered bushing 46 is configured to be mounted on a threaded portion of the shaft 41. As will be appreciated, the threaded portion of the shaft 41 will be some portion of the shaft, greater than the desired travel distance of the tapered bushing 46. As the nut 48 is tightened, the tapered bushing 46 slides upward along the shaft 41, such that it forces the barrel portion 43 of the split sleeve 42 outward to mechanically engage the walls of the flange 12 within the hole.

As previously described, to provide planar stability of the template 10, standoff screws or feet 24 may be screwed into holes in the underside of the template 10 as illustrated. As will be described in further detail below, the height of the feet 24 (i.e., the thickness of the gap between the template 10 and the flange 12) is equal to or slightly less than the thickness of the portion of the magnet carrier plate of the drill 38 which extends through the template 10 and rests on the surface of the flange 12. The through-bolt assembly 40 may also include a sleeve bearing 54, a washer 56, and a flange 58. The through-bolt assembly 40 may advantageously provide a hexagonal head 60 configured to be engaged by a hexagonal wrench, for instance. In summary, the through-bolt assembly 40 is configured to couple the template 10 to the flange 12 in a way which acts as a pivot mechanism for the template 10 with respect to the flange 12 and to be readily accessible for efficient use. As will be appreciated, alternate embodiments of the through-bolt assembly 40 may be utilized to secure the template 10 to the flange 12, such that the template 10 is rotatable about the shaft 41 of the through-bolt assembly 40.

In an alternate embodiment, if the drilling is done with the flange 12 in a horizontal position, the through-bolt assembly 40 may be configured such that it extends through a hole in the underlying flange 12, but is not secured thereto. The through-bolt assembly 40, in this embodiment, would use the hole in the flange 12 for positioning, but the through-bolt assembly 40 may not necessary be designed to secure the template 10 to the flange 12. As will be appreciated, in drilling environments, where the flange 12 is horizontal, such a fastening mechanism may not be necessary, as the safety and damage issues of a magnetic drill hold-down failure are not as significant when drilling in the horizontal configuration.

Referring again to FIGS. 4 and 5, the cam assembly 62 is also visible in FIG. 4. As will be described in greater detail with regard to FIG. 8, the cam assembly 62 includes an eccentric disk 64 which is configured to rotate against the sidewalls of a pre-existing hole 66 in the flange 12. Rotation of the cam assembly 62 will pivot the template 10 about the through-bolt assembly 40 such that it can be secured into position for drilling the tag pocket 14. Referring briefly to FIG. 8, a detailed view of the cam assembly 62 taken along the cut lines 8-8 of FIG. 4. As previously described, the cam assembly 62 includes a cam bolt shaft 68 which is disposed through a hole in the template 10 such that the eccentric disk 64 is positioned within the hole 66 in the flange 12. A retainer ring 70 may be employed to affix the cam bolt shaft 68 into a fixed vertical position within the template 10. When the cam bolt shaft 68 is rotated, via a tool engaging the hexagonal head 72 and/or the cavity 74, the template 10 will pivot about the through-bolt assembly 40 until it is locked into position for drilling, as described further below. FIG. 8 also illustrates an additional standoff screw or foot 24 to provide planar stability of the template 10. As with the previously described feet 24, the height of the foot 24 is equal to or slightly less than the height of the drill magnet carrier plate extending below the template 10 once installed for drilling.

Referring again to FIGS. 4 and 5, the template 10 also includes a guide pin 76 coupled to the underside of the template 10. As shown in the dashed illustration of FIG. 4, once the template 10 is secured to the flange 12 via the through-bolt assembly 40, the cam assembly 62 may be utilized to pivotally rotate the template 10 into a drilling position which is determined by the position of the guide pin 76. As illustrated, the guide pin 76 is configured to abut the side of the flange 12 such that it cannot be rotated about the through-bolt assembly 40 any further than the guide pin 76 will allow. In this way, the cam assembly 62 is used in conjunction with the guide pin 76 to accurately position the template 10 such that the drill 38 is also accurately positioned for drilling tag pocket 14. Before discussing the drill 38, in detail, a cross-sectional view of the guide pin 76 taken through the cut lines 9-9 of FIG. 4 is illustrated in greater detail with respect to FIG. 9.

Referring now to FIG. 9, a cross-sectional view of the guide pin 76 is illustrated. As illustrated, the guide pin 76 includes a bushing 78 and a mounting screw 80. The mounting screw 80 facilitates the coupling of the guide pin 76 to the underside of the template 10. As will be appreciated, the template 10 includes a threaded hole on the underside formed at a predetermined location to facilitate the drilling of the tag pocket 14 in the desired location of the flange 12. As previously described, the cam assembly 62 is used to rotate the template 10 such that the guide pin 76 is brought into contact with the edge of the flange 12 as shown at interface 82. The drill bit 84 is illustrated after having been positioned into the flange 12 such that the tag pocket 14 will exist once the drill bit 84 is removed.

The template 10 includes a hole and a drill bushing 86 sized to receive the drill bit 84. A larger clearance hole 88 may be provided at the top surface of the template 10 to provide clearance for the lower portion of the drill chuck 90. A drill stop 92 is included on the drill 38 to prevent the drill bit 84 from extending too far into the flange 12 and to prevent the upper portion of the drill chuck 94 from hitting the surface of the template 10 while the tag pocket 14 is being drilled.

Referring again to FIG. 4, the template 10 may also include a clearance hole 96. The clearance hole 96 is merely provided as an example of an opening in the template 10 that may be incorporated such that features extending from the surface of the flange 12 such as a coupling 98 that may be configured to mate with the coupling of another flange during operation are cleared. For instance, if the flange 12 is part of a riser, when utilized for down hole applications, the risers may be coupled together at the face of the flange and via mated couplings 98. These couplings 98 may provide a portion of the conduit for choke or kill lines, for example. As will be appreciated, the template 10 may include various clearance holes 96 to allow the template 10 to be positioned properly against the flange 12 during a drilling operation, regardless of whether additional couple features are coupled to the face of the drilling surface.

As most clearly illustrated in FIG. 5, one embodiment of the magnetic drill 38 that may be used in conjunction with the template 10 includes an upper drilling portion coupled to a magnetic carrier plate 100. As illustrated, the magnetic carrier plate 100 is coupled to the drill 38. The drill 38 may be bolted to the magnetic carrier plate 100, for instance. The drill 38 may include an alignment pin 102 to align the drill 38 with the magnetic carrier plate 100. As previously described, the magnetic carrier plate 100 is configured to be positioned through the magnetic drill base opening hole 22 in the template 10. The magnetic carrier plate 100 may be secured within the template 10 via the locking set screws 104. As illustrated, the locking set screws 104 may be included in the plain of the template 10 such that when tightened, they engage the magnetic carrier plate 100. Advantageously, by including locking set screws 104 in the template 10, the drill 38 will be mechanically secured to the surface of the flange 12 even if there is a power loss.

Other features of the drill 38 are shown as an example and will be appreciated by those skilled in the art. For instance, in addition to the drill bit 84 and drill chuck 94, the drill 38 may include an extension sleeve 106, a rack and pinion feed mechanism 108, a drilling apparatus slide 110 and a feed handle 112. When the feed handle 112 is rotated, the drill 38 may be moved along the rack and pinion feed mechanism 108 and drilling apparatus slide 110 such that the drill bit 84 may be lowered to engage the flange 12. The drill 38 may further include a mounting bracket 114 to secure the drilling components to the feed mechanism 108 and slide 110. As will be appreciated, the drill 38 also includes the power cord 116.

Also illustrated in FIGS. 4 and 5, is a lift assembly 118. The lift assembly 118 may be utilized to lift and position the magnetic drill 38 for drilling. The lift assembly 118 may include a vertical lifting arm 120 and a shackle 122. The shackle 122 may be configured to be coupled to a chain 124 via a hook 126, as will be appreciated. As illustrated in FIG. 4, the lift assembly 118 may also include mounting plates 128 such that the lift assembly 118 can be coupled to an available lifting source and readily used in either the vertical or horizontal position. The mounting plates have various holes so that the tool may hang in a balanced manner with different sizes or weights of through bolts, nuts, cams, or other accessories which may be employed.

Figure 6:
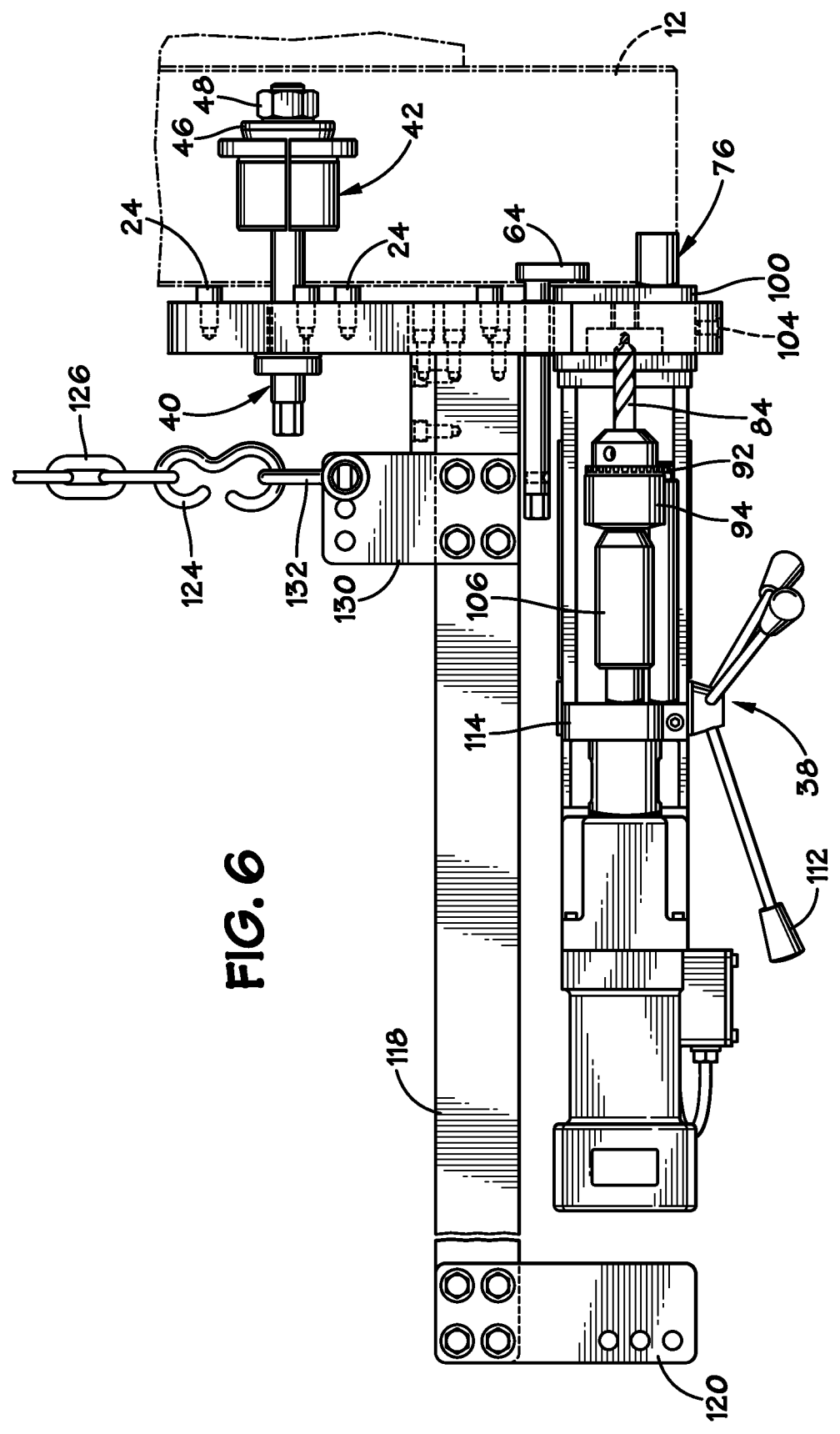

Referring now to FIG. 6, an alternative implementation of the drill using the lift assembly 118 is illustrated. As illustrated in FIG. 6, the lift assembly 118 may also include a horizontal lifting arm 130 such that the drill 38 can be used to drill the tag pocket 14 from a horizontal position. The shackle 132 coupled to the horizontal lifting arm 130 of the lift assembly 118 may be coupled to the chain 126 via the hook 124 as previously described. As is also evident in FIG. 6, the lift assembly 118 provides the ability to drill in the horizontal direction using the horizontal lifting arm 130 or in the vertical direction using the vertical arm 120. The preferred drilling direction may depend upon the positioning of the flange 12.

Figure 7:
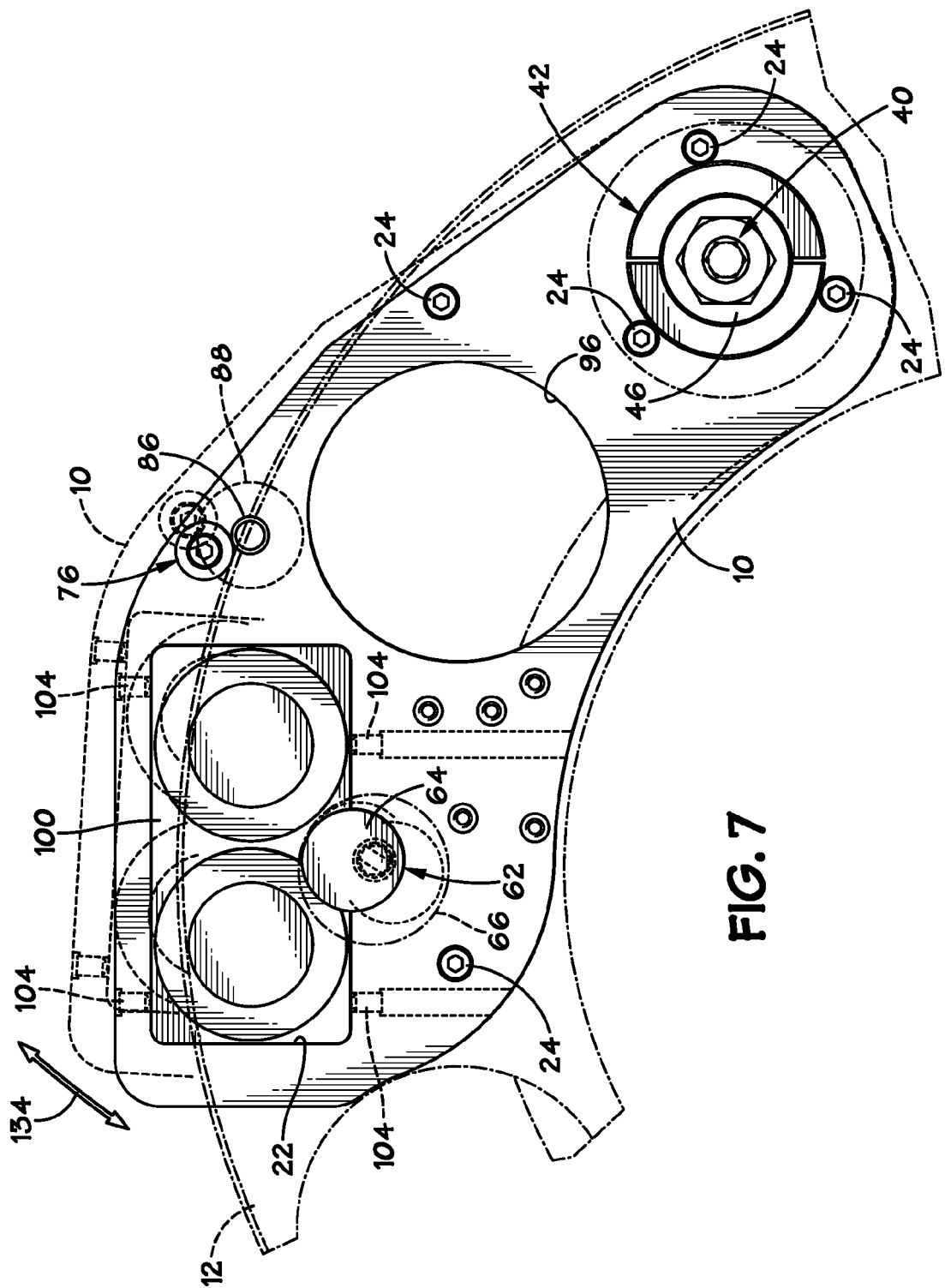

Referring now to FIG. 7, a view of the underside of the template 10, with the flange 12 indicated, is illustrated. As previously described and illustrated, the through-bolt assembly 40 is used to couple the template 10 to the flange 12 such that it may rotate about the through-bolt assembly 40, as indicated by the rotational arrow 134. Once positioned, the cam assembly 62 may be used to rotate the template 10 to engage the guide pin 76 along the edge of the flange 12 for drilling. FIG. 7 also illustrates the underside of the magnetic carrier plate 100 which may be magnetically coupled to the flange 12 during a the drilling process and mechanically secured to the template 10 via the locking set screws 104.

While the illustrated embodiments provide a template 10 to be used in conjunction with a flange 12, such as a riser flange, a drilling template in accordance with alternative embodiments may be configured for drilling into any tool, equipment or material, and especially for applications wherein an edge mounted RFID tag 26 may be useful. Further, while the presently described template 10 is configured for use with a specific flange, a template may have alternative configurations such that it can be used with multiple flanges, or pieces of equipment. For instance, the template might include a first configuration and arrangement of holes configured to receive a through-bolt assembly, cam assembly and guide pin, and a second arrangement of holes configured to receive the through-bolt assembly, cam assembly and guide pin. Thus, the two or more configurations may allow for switching of the through-bolt assembly, cam assembly and guide pin between first and second arrangements and thus use with two different flanges, for instance.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A drilling template, comprising:
a first hole configured to receive a through-bolt assembly;
a second hole configured to receive a cam assembly;
a third hole configured to receive a guide pin;
a through-bolt assembly disposed through the first hole and configured to anchor the drilling template to an underlying material, such that the drilling template is rotatable about the through-bolt assembly; and
a cam assembly disposed through the second hole and configured to rotate the drilling template about the through-bolt.

2. The drilling template, as set forth in claim 1, wherein the drilling template is configured to be matably coupled to a flange, and wherein the drilling template is configured to be used in drilling a hole in the edge of a flange.

3. The drilling template, as set forth in claim 2, wherein the hole is a tag pocket configured to receive an RFID tag.

4. The drilling template, as set forth in claim 1, comprising a guide pin configured to limit the rotation of the drilling template.

5. The drilling template, as set forth in claim 4, wherein the guide pin is configured to abut a side of the material to lock the drilling template in a fixed position using the cam assembly.

6. The drilling template, as set forth in claim 1, comprising a through-bolt assembly disposed through the first hole and configured to position the drilling template to rotate about the through-bolt and an underlying material.

7. The drilling template, as set forth in claim 1, comprising a fourth hole configured to receive a base of a drill.

8. The drilling template, as set forth in claim 7, wherein the fourth hole is configured to receive a magnetic carrier base of a drill.

9. The drilling template, as set forth in claim 1, wherein the first hole and the second hole are configured to align with holes in a flange.

10. A drilling template, comprising:
a through-bolt assembly disposed through the drilling template and configured to anchor the drilling template to an underlying material, such that the drilling template is rotatable about the through-bolt assembly;
a cam assembly disposed through the drilling template and configured to rotate the drilling template about the through-bolt; and
a guide pin configured to stop the rotation of the drilling template.

11. The drilling template, as set forth in claim 10, wherein the guide pin is coupled to the backside of the drilling template.

12. The drilling template, as set forth in claim 10, wherein the cam assembly is configured to rotate the drilling template above the material, and into a locking position, wherein the guide pin is brought into contact with an edge of the material.

13. The drilling template, as set forth in claim 10, wherein the through-bolt assembly comprises;
a through-bolt shaft configured to extend through the drilling template and an opening in the material; and
a lock nut configured to engage the through-bolt shaft within the opening in the material to lock the through-bolt shaft in place with reference to the material.

14. The drilling template, as set forth in claim 10, comprising a plurality of stand-off caps, configured to provide a spacing between the drilling template and the material, and configured to provide planarity of the drilling template with regard to the material.

15. The drilling template, as set forth in claim 10, wherein the drilling template is configured to hold a drill to drill into the material.

16. A method of drilling a hole in an object, comprising;
coupling a drilling template to a drilling surface of an object, using a through-hole assembly;
rotating the drilling template about the through-hole assembly;
locking the drilling template into a drilling position
coupling a drill to the drilling template; and
drilling a hole in an object;
wherein rotating the drilling template comprises rotating the drilling template using a cam assembly coupled to the drilling plate.

17. The method, as set forth in claim 16, wherein coupling the drilling template to the drilling surface comprises, disposing a shaft through a hole in the drilling template and through a hole in the object, and locking the shaft into a position relative to the drilling template and the object, such that only rotational movement within the holes is allowed.

18. The method, as set forth in claim 16, wherein rotating the drilling template comprises rotating the cam assembly such that an eccentric disc of the cam assembly rotates against an inner surface of a hole in the object, thereby moving the drilling template.

19. The method, as set forth in claim 16, wherein locking comprises rotating the drilling template until the drilling template is fixedly positioned with a guide pin abuting an edge of the object.

20. The method, as set forth in claim 16, wherein coupling a drill comprises coupling a magnetic drill to the drilling template.

21. The method, as set forth in claim 16, wherein coupling the drill comprises mechanically coupling a drill to the drilling template.

22. The method, as set forth in claim 16, wherein drilling the hole comprises, drilling a hole in an edge of the object.

23. The method, as set forth in claim 16, wherein drilling the hole comprises drilling the hole in an edge of a flange.

24. The method, as set forth in claim 16, wherein drilling the hole comprises drilling a pocket configured to receive an RFID tag.

25. The method, as set forth in claim 16, wherein drilling the hole comprises drilling the hole using a drill positioned in a horizontal direction.

\* \* \* \* \*